US008877105B2

(12) United States Patent  
D'Oria et al.

(10) Patent No.: US 8,877,105 B2  
(45) Date of Patent: Nov. 4, 2014

(54) PROCESS FOR MANUFACTURING ELASTOMERIC TIRE COMPONENTS

(75) Inventors: Francesco D'Oria, Milan (IT); Enrico Sabbatani, Milan (IT); Maurizio Marchini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1756 days.

(21) Appl. No.: 11/664,704

(22) PCT Filed: Oct. 8, 2004

(86) PCT No.: PCT/EP2004/011431  
§ 371 (c)(1),  
(2), (4) Date: Jan. 10, 2008

(87) PCT Pub. No.: WO2006/037369  
PCT Pub. Date: Apr. 13, 2006

(65) Prior Publication Data  
US 2008/0236726 A1 Oct. 2, 2008

(51) Int. Cl.  
*B29C 47/92* (2006.01)  
*B29C 47/00* (2006.01)  
*B29C 47/78* (2006.01)  
*B29C 35/00* (2006.01)  
*B29C 47/82* (2006.01)  
*B29C 47/36* (2006.01)  
*B29D 30/16* (2006.01)  
*B29C 47/08* (2006.01)  
*B29C 35/16* (2006.01)  
*B29C 35/04* (2006.01)  
*B29K 301/10* (2006.01)  
*B29C 47/02* (2006.01)  
*B29L 30/00* (2006.01)  
*B29K 21/00* (2006.01)  
*B29K 105/24* (2006.01)

(52) U.S. Cl.  
CPC ......... *B29C 47/82* (2013.01); *B29C 2035/1633* (2013.01); *B29C 2035/043* (2013.01); *B29K 2301/10* (2013.01); *B29C 47/92* (2013.01); *B29C 47/364* (2013.01); *B29D 30/16* (2013.01); *B29C 47/0866* (2013.01); *B29C 2947/92895* (2013.01); *B29C 47/0019* (2013.01); *B29C 47/02* (2013.01); *B29L 2030/00* (2013.01); *B29K 2021/00* (2013.01); *B29C 47/0004* (2013.01); *B29C 2035/1616* (2013.01); *B29C 2947/92704* (2013.01); *B29K 2105/24* (2013.01); *B29C 35/041* (2013.01); *B29C 47/367* (2013.01)  
USPC ..... 264/40.6; 264/40.1; 264/40.7; 264/172.1; 264/173.1; 264/176.1; 264/211.23; 264/211.24; 156/110.1; 156/111; 156/117; 156/133; 156/135; 156/244.11; 156/397

(58) Field of Classification Search  
None  
See application file for complete search history.

(56) References Cited

U.S. PATENT DOCUMENTS

| | | | |
|---|---|---|---|
| 3,854,034 A | 12/1974 | Leitner et al. | |
| 3,866,669 A | 2/1975 | Gardiner | |
| 4,102,958 A * | 7/1978 | Wertz | 264/40.6 |
| 4,262,737 A * | 4/1981 | Faillace | 165/267 |
| 4,425,289 A * | 1/1984 | Lee et al. | 264/40.1 |
| 4,649,262 A | 3/1987 | Yoshikawa | |
| 5,162,070 A * | 11/1992 | Meyer | 156/500 |
| 6,468,067 B1 | 10/2002 | Ikegami | |
| 6,761,841 B2 * | 7/2004 | Ogawa et al. | 264/40.1 |

FOREIGN PATENT DOCUMENTS

| | | |
|---|---|---|
| EP | 0 492 425 B1 | 7/1992 |
| EP | 1 118 447 A2 | 7/2001 |
| EP | 1 211 050 B1 | 6/2002 |
| GB | 1 048 0241 | 11/1966 |
| WO | WO 00/35666 | 6/2000 |
| WO | WO 01/36185 A1 | 5/2001 |

OTHER PUBLICATIONS

Tool and Manufacturing Engineers Handbook Knowledge Base, Society of Manufacturing Engineers, 1998, chapter 5, p. 43.*  
Nagakura, Y., "Method for Automatically Raising Temperature of Multi-Zone Temperature Controlling System of Extruder or the Like," Patent Abstracts of Japan of JP No. 01267022, filed Oct. 24, 1989, 1 Sheet.  
Harada, N., "Method and Apparatus for Controlling Temperature of Heating Cylinder of Plasticizing Device," Patent Abstracts of Japan of JP. No. 05237892, filed Sep. 17, 1993, 1 Sheet.

* cited by examiner

*Primary Examiner* — Jeffrey Wollschlager  
(74) *Attorney, Agent, or Firm* — Finnegan, Henderson, Farabow, Garrett & Dunner, L.L.P.

(57) ABSTRACT

A process for manufacturing an elastomeric tire component includes the steps of a) preparing an elongated element including a cross-linkable elastomeric material by feeding it to an extruding device having a plurality of units, each having a respective thermal inertia, and b) delivering the elongated element onto a building support, and further includes at least one non-productive step of c) submitting at least one of the units of the extruding device to a thermal transition selected from heating or cooling, substantially reducing the risk of scorching during the thermal transition from and to the non-productive step ranking the units according to their thermal inertia and heating the units starting with the top-ranked unit sequentially to the bottom-ranked unit to reach the respective working temperature or cooling the units starting from the maximum working temperature unit sequentially to the minimum working temperature unit to reach the respective non-working temperature.

64 Claims, 4 Drawing Sheets

PROCESS FOR MANUFACTURING ELASTOMERIC TIRE COMPONENTS

CROSS REFERENCE TO RELATED APPLICATION

This application is a national phase application based on PCT/EP2004/011431, filed Oct. 8, 2004, the content of which is incorporated herein by reference.

BACKGROUND OF THE INVENTION

1 Field of the Invention

The invention relates to a process for manufacturing elastomeric tire components and more particularly tire components for motorvehicles.

2 Description of the Related Art

Generally speaking, a tire for motorvehicles comprises a carcass structure made up of one or more carcass plies of a substantially toroidal shape and having their axially opposite side edges in engagement with respective annular reinforcing elements usually referred to as "bead cores", a tread band made of an elastomeric material at a radially outer position with respect to said carcass structure, a belt structure interposed between said carcass structure and said tread band and a pair of axially opposite sidewalls on said carcass structure, each of which covers a side portion of the tire radially extending between a so-called shoulder region of the tread band and a so-called bead located at the respective bead core.

It should be specified herein that in the present description and in the subsequent claims, the term "elastomeric material" is used to indicate a composition comprising at least one elastomeric polymer and at least one reinforcing filler. Typically, such a composition also comprises additives such as, for example, a vulcanizing agent and/or a plasticizer. Thanks to the presence of the vulcanizing agent, such a material may be vulcanized by heating, so as to form the end product.

In the field of tire manufacture, it has been proposed to form elastomeric tire components by laying a continuous elongated element of a suitable elastomeric material onto a substantially cylindrical or toroidal support rotatable about its rotation axis. Such a continuous elongated element generally has a reduced size as compared with that of the final component to be obtained and is arranged on the rotatable support so as to form a plurality of consecutive coils arranged side by side and/or in overlapped relationship with one another.

It should be specified herein that in the present description and in the subsequent claims, the term "elastomeric tire component" is used to indicate all those components of the final tire, or parts thereof, which are constituted by an elastomeric material.

Non limitative examples of elastomeric tire components according to this definition are: the tread band; the sidewalls; the so-called liner, that is a thin layer of elastomeric material that, once vulcanization has been completed, will be airtight so as to ensure maintenance in use of the tire's inflating pressure; the so-called under-liner, interposed between the liner and the carcass plies; the under-belt inserts; the filling inserts of the annular reinforcing structures; the sidewall inserts of the so-called run-flat tires; the abrasion-resistant inserts externally applied close to one of the tire bead elements; or parts of any of these exemplary components.

In particular, when, as an example, the sidewalls and/or the tread band are realized in two or more distinct parts, each made of a specific elastomeric material, the term "elastomeric tire component" indicates each of the aforesaid parts of the sidewalls and/or of the tread band.

International patent applications WO 00/35666 and WO 01/36185, in the name of the present Applicant, teach that some of the tire components can be obtained by delivering an elongated element from an extruder and by suitably depositing this element on a support bearing the green tire being manufactured, said support being rotated about its own axis and moved with respect to the extruder by a robotized arm for obtaining a transversal deposition of the elongated element to form a plurality of circumferentially axially adjoined and/or radially overlapped coils that give rise to the tire component. The orientation and mutual-overlapping parameters of said coils are suitably managed so as to control the thickness of each a elastomeric tire component being made, based on a predetermined deposition scheme preset on an electronic computer.

Known from document GB 1,048,241 is a machine for laying down a layer of elastomeric material of varying thickness on a tire carcass and comprising a feeding head to apply a ribbon of elastomeric material to the carcass, means for setting the carcass in rotation about its axis for winding of a plurality of coils thereon when the carcass rotates with respect to the feeding head, means for moving the feeding head transversely of the carcass, from one side to the other of the circumferential median plane of the carcass, and means for automatically varying the transverse-movement amount for each winding revolution so as to vary the overlapping degree of the contiguous coils and consequently thickness of the layer formed on the carcass. In an appropriate version for making new tires, during formation of the tread band the carcass is mounted on a building drum and has a cylindrical right conformation.

EP 1 211 050 describes a method for extruding a tire rubber material by a positive displacement extruding system including as seen from an upstream side of the tire rubber, a screw extruder unit, a gear pump unit and an extrusion head unit with an extrusion nozzle, which are connected in series with each other. While the tire rubber is caused to flow through the extruding system, the temperature of the rubber material is measured and controlled to be within a predetermined temperature range.

EP 492,425 describes an extrusion system and a method for extruding strips of rubber compounds which are uniformly heated and mixed in an extruder. A control system regulates the speed of the extruder to provide a near constant pressure at the entrance port of the gear pump to precisely regulate the rate of extrusion of the compound from the extrusion head. The temperature of the rubber compound is maintained within a predetermined temperature range less than 100° C. Temperatures and pressures are said to be measured at the various other positions in the system as inputs for algorithms which are designed to induce changes in the speed of feed mixer during start-up, shutdown and steady state operations, to maintain the desired pressures, feed rates and temperatures throughout the entire system.

U.S. Pat. No. 6,468,067 discloses a composite extruding apparatus of rubber and a method of extruding unvulcanized rubber. The apparatus has a reduced screw length, whereby the material residue is reduced, and the temperature control is facilitated to prevent rubber scorching. The temperature control is said to be effected by an ordinary method.

SUMMARY OF THE INVENTION

The Applicant observed that the methods and apparatuses of the prior art for manufacturing elastomeric tire components have some drawbacks.

In particular, the industrial process can imply transitions from productive to non-productive steps and vice-versa. In other words, the production can be interrupted for various reasons, for example, problems in or specific requests from a subsequent station of the manufacturing plant, or a failure of a part of the extruder.

One of the problems faced when extruding elastomeric tire components including a cross-linkable elastomeric material is connected with the temperature control of the extruder. Excessive and/or unduly prolonged heating can cause the premature vulcanization, otherwise known as "scorch", of the cross-linkable elastomeric material. On the other side, a temperature such to provide the elastomeric material with a fluidity suitable for the workability should be maintained.

The Applicant experienced the necessity of timely and efficiently managing the temperature of the different parts of an extruding device during these transitions, taking into account, e.g., the following aspects:

the extruding device comprises units which differ in terms of mass, thermal inertia and working temperature;

emptying the extruding device by totally discharging the elastomeric material during the pause is not only expensive and time-consuming, but also difficult to achieve, and residues of material can remain inside the extruding device for a long time and consequently alter the quality of subsequent extruded components;

the material to be worked-up is thermal sensitive.

In the production contexts of manufacturing elastomeric tire components to which the present invention is addressed, the Applicant has become aware of the fact that traditional methods, in which said non-productive step lasts for a prolonged period of time during which the elastomeric material remain at high temperatures, tend to produce a material that is subjected to the aforementioned undesired premature vulcanization ("scorching" phenomenon), generating a low-quality elastomeric material, not having the requested physical-mechanical properties.

In addition, due to said different characteristics of each of the units of the extruding device, the Applicant further experienced that, during said non-productive steps, it was difficult to manage the transition of each unit from a non-working temperature to a working temperature or vice-versa, as herein below defined, avoiding scorching phenomena and obtaining at the same time the best results in terms of time and energy consumption.

In accordance with the present invention, in dealing with the above discussed problems, the Applicant has considered the possibility of achieving substantially improvements in terms of production flexibility and quality of the product by manufacturing an elastomeric tire component by a process which manages in a specific way the thermal transitions from and to said non-productive steps.

In more detail, it is an object of the present invention to provide a process for manufacturing an elastomeric tire component comprising the productive steps of:

a) preparing an elongated element including a cross-linkable elastomeric material, and b) delivering said elongated element onto a building support rotatably moving about a geometrical rotation axis thereof, so that the elongated element is circumferentially applied on the support;

the preparing step a) comprising:

a1) feeding the cross-linkable elastomeric material to an extruding device comprising a plurality of units;

a2) extruding the cross-linkable elastomeric material by means of said extruding device so as to form said elongated element;

each of said units having a respective working temperature;

each of said units having a respective non-working temperature lower than said working temperature;

each of said units having a respective thermal inertia, said units being ranked according to their thermal inertias so as to have at least one top-ranked unit and at least one bottom-ranked unit;

said process further comprising at least one non-productive step of c) submitting at least one of the units of the extruding device to a thermal transition, wherein said thermal transition is carried out by c1) heating said at least one unit starting from the top-ranked unit sequentially to the bottom-ranked unit to reach the respective working temperature; or by c2) cooling said at least one unit starting from the unit having the maximum working temperature sequentially to the unit having the minimum working temperature to reach the respective non-working temperature.

Thermal inertia (I) is herein defined as the tendency of a material to resist changes in temperature and can be expressed as follows:

$$I=(\kappa \rho c)^{1/2}$$

wherein k is the thermal conductivity, $\rho$ is the bulk density of the material; and c is the specific heat capacity per unit mass, i.e. $J/cm^2 \cdot sec^{1/2} \cdot C.°$ (Joule on per square centimeter per square root second per centigrade).

Working temperature of the units of the extruding device is herein defined as the temperature at which each unit of the extruding device is maintained during the extrusion operations of the process for manufacturing the thermo-vulcanizable elastomeric material; that means, that, at temperature values lower than said working temperature, the extrusion process is in the non-productive step.

Non-working temperature of the units of the extruding device is herein defined as a temperature lower than the working temperature and which allows to avoid scorching phenomena of the cross-linkable elastomeric material residing in the unit for a predetermined stay time. Said non-working temperature can correspond to the room temperature in case of a shut-down of the extruding device. Said non-working temperature can also correspond to a temperature higher than the room temperature during a non-productive step of the process in which the extruding device is stand-by such as, for example, in case of an emergency.

The stay time for each unit, as herein defined, is the time that a portion of the elastomeric material spends in said unit. On the other hand, the scorch time is herein defined as the safety margin of time that a rubber compound can be worked at a given temperature before vulcanization begins. Scorch time can be measured with an oscillating disc rheometer (ODR) according to ASTM D4084-95 and is the time necessary to increase the torque value of two units (TS2 or Mooney Scorch).

The process for manufacturing an elastomeric component of the present invention comprises at least one non-productive step, being herein defined as a step in which the manufacturing process is in stand-by, i.e. the polymeric material is not delivered/advanced through the extruding device. Examples of non-productive steps are the extruding device start-up, emergencies and pauses.

According to the invention, said at least one non-productive step of submitting the units of the extruding device to a thermal transition selected from heating or cooling is carried out by:

heating said at least one unit starting from the top-ranked unit sequentially to the bottom-ranked unit to reach the respective working temperature; or by cooling said at least one unit starting from the unit having the maximum working temperature sequentially to the unit having the minimum working temperature to reach the respective non-working temperature.

"Sequentially" means that a unit can get involved in the thermal transition when the previously involved unit is still under thermal transition.

During said non-productive step, entailing cooling of the units, due to the high temperatures present within said units of the extruding device, and due to the fact that said extruding device has been stopped thereby trapping therein a certain amount of elastomeric material, there is the risk that the latter may undergo to scorching phenomena when a critical threshold value of the stay time is surpassed.

If these phenomena occur a low-quality elastomeric tire component without the requested physical-mechanical properties could be generated. In addition, a prevulcanization of the elastomeric material would imply the need of removing all the traces of scorched material from the extruding equipment before starting a new production cycle, such removing being time-consuming and in some cases not fully accomplishable.

The Applicant has surprisingly found that the process of the present invention allows to substantially reduce the risk of scorching phenomena, due to the fact that said cross-linkable elastomeric material remains in at least one of the units of the extruding device for limited controlled periods of time and/or at controlled temperature.

Still in accordance with the present invention, the Applicant has found that it is possible to overcome the constraints of the processes of the known art in terms of time and energy consumption during the aforementioned cooling thermal transitions thanks to the fact that it is possible to maintain most of the units having a lower working temperatures at their respective working temperature, while only those having a higher working temperature (with a higher risk of scorching) are cooled to their non-working temperatures.

Said elongated element including a cross-linkable elastomeric material used in the process of the present invention preferably has a flattened cross-section, such as for example rectangular, elliptical or lenticular, which is greatly reduced as compared with the cross-section of the elastomeric component that is wished to be made. By way of non limitative example, said elongated element may have a width included in the range of from 3 millimeters to 15 millimeters, and a thickness included in the range of from 0.5 millimeters to 2 millimeters.

The elongated element used in the process of the present invention can be delivered onto a building support rotatably moving about a geometrical rotation axis thereof, so that the elongated element is circumferentially applied on the support.

Preferably, the building support has an outer surface substantially mating in shape to the inner configuration of the tire to be formed. More preferably, said building support is a substantially rigid toroidal support. In an alternative embodiment, the building support may have a substantially cylindrical outer surface.

The extruding device used in the process of the present invention is generally positioned close to the building support so as to facilitate the delivering operations of the elongated element onto the building support itself.

The extruding device used in the process of the present invention may be a conventional extruder or injector equipment and comprises a plurality of units.

Preferably, said units include: at least one housing, at least one member for moving the elastomeric material within said housing and at least one shaping die.

Preferably, said at least one member for moving the elastomeric material is selected from the group consisting of a screw rotatably mounted in said at least one housing and a piston slidably mounted in said at least one housing.

Preferably, the extruding device further includes at least one nozzle. More in particular, said extruding device is preferably provided with a so-called outlet "die" for shaping the elastomeric material being worked at an orifice conveniently shaped and sized depending on the geometric and dimensional features to be given to the product itself.

Preferably, the extruding device further includes a gear pump operatively associated to said member for moving the elastomeric material to realize a positive-displacement extruding device. The gear pump increases the elastomeric-material pressure until bringing it to values included in the range of from about 200 and about 650 bars, preferably to about 400 bars, said elastomeric material being finally extruded through said die.

The extrusion screw and the gear pump are each preferably driven by different power units, although said power units can be also replaced by a single power unit.

Preferably, said at least one housing of the extruding device has a working temperature within the range of from 50° C. to 120° C., more preferably from 70° C. to 90° C.

Preferably, said at least one member of the extruding device for moving the elastomeric material has a working temperature within the range of from 20° C. to 120° C., more preferably from 60° C. to 100° C.

Preferably, said at least one shaping die of the extruding device has a working temperature within the range of from 80° C. to 130° C., more preferably from 90° C. to 120° C.

Preferably, said at least one nozzle of the extruding device has a working temperature within the range of from 70° C. to 120° C., more preferably from 80° C. to 120° C.

Preferably, said at least one gear pump of the extruding device has a working temperature within the range of from 70° C. to 120° C., more preferably from 80° C. to 110° C.

The above mentioned preferred temperature ranges are related to the average compounds viscosity levels and scorching conditions. The temperature level optimization should lead to a maximization of compounds fluidity (higher temperature means lower extrusion pressure) minimizing the scorch risk (lower temperature means less scorch tendency). The indicated temperature ranges encompass the viscosity and scorching conditions used in tire compounds.

For the purposes of the present description and of the claims which follow, except where otherwise indicated, all numerical values expressing parameters such as amounts, temperatures, percentages, and so forth, are to be understood as being modified in all instances by the term "about". Also, all ranges include any combination of the maximum and minimum points disclosed and include any intermediate ranges therein, which may or may not be specifically enumerated herein.

In a preferred embodiment, the process of the present invention further comprises the step of d) checking in real-time the actual temperature, the working temperature, the non-working temperature and the difference between said actual temperature and said working temperature of each of the units of the extruding device.

Preferably, said checking step is carried out by means of a temperature control system operatively connected to the extruding device.

Still more preferably, the temperature control system comprises at least a sensor on a body of each unit.

In a preferred embodiment, the temperature control system is provided with channels wherein a heat exchange fluid circulates. More preferably, said heat exchange fluid is selected from pressurised water or oil.

Preferably, said heat exchange fluid has a maximum pressure comprised in the range of from 6 to 9 bar and, more preferably, of 7 bar.

In the process of the present invention, said cross-linkable elastomeric material has a stay time that is equal to or lower than the scorch time, in each units.

Preferably, said cross-linkable elastomeric material has a stay time, in each unit, ranging of from 20% to 99% of the scorch time of said cross-linkable elastomeric material at the actual temperature of the unit.

More preferably, said cross-linkable elastomeric material has a stay time, in each unit, ranging of from 20% to 50% of the scorch time of said cross-linkable elastomeric material at the actual temperature of the unit.

In order to carry out the process of the invention, each of the units of the extruding device is ranked according to its thermal inertia so as to have at least one top-ranked unit and at least one bottom-ranked unit; in addition, all the intermediate ranked units between said top-ranked unit and said bottom-ranked unit are also preferably ranked in a decreasing order.

According to a preferred embodiment of the process of the present invention, the top-ranked unit is the housing, while the bottom-ranked unit is the shaping die.

More preferably, said units, as ranked in decreasing order from the top-ranked unit to the bottom-ranked unit according to their thermal inertia, are: said at least one housing, said at least one member for moving the elastomeric material within said at least one housing, said at least one gear pump and said at least one shaping die.

According to a first aspect of the invention, all the units of the extruding device or some of the same are submitted to a thermal transition which is carried out by sequentially heating said units starting from the top-ranked unit to the bottom-ranked unit to reach the respective working temperature.

Thus, for example, during a non-productive step of the process which comprises the start-up operations of the extruding device, all the units are heated by raising the temperature of each unit from a preset non-working temperature to a working temperature.

Preferably, the at least one housing of the extruding device is the first unit to be submitted to said heating thermal transition during said start-up non-productive step, being said housing the top-ranked unit, while the other units are heated in sequence according to their different thermal inertias, the bottom-ranked shaping die being the very last unit to be submitted to the heating thermal transition.

Since each of the units needs a different time for passing from its non-working temperature to its working temperature on account of its specific thermal inertia, the heating step of the different units preferably starts at different times during a given non-productive step, so that the heating of the units last for different periods of time.

Preferably, the heating time of each of said plurality of units differs from the heating time of the remaining units of said plurality of an amount which is lower than or equal to 60 minutes, more preferably, lower than or equal to 30 minute.

Preferably, the heating of each predetermined unit different from said top-ranked unit starts when the actual temperature of the preceding unit of higher rank reaches a value which is from 20° C. to 30° C. lower than the working temperature of said preceding unit; more preferably, from 10° C. to 20° C. lower than the working temperature of said preceding unit.

Still more preferably, the heating step of said plurality of units is carried out so that the units reach their respective working temperature in less than 10 minutes, more preferably substantially simultaneously.

Within the framework of the present description and of the appended claims, the expression: substantially simultaneously is used to indicate that all the units reach their respective working temperatures at the same time or that the period of time which lapses between the first unit has reached its respective working temperature and the last unit has reached its respective working temperature is lower than a predefined value, such as, for example, lower than 5 minutes, preferably lower than 3 minutes.

According to a second aspect of the invention, all the units of the extruding device or some of the same are submitted to a thermal transition which is carried out by sequentially cooling said units.

Preferably, such a sequential cooling is managed by activating a timer that is started for each of the units of the extruding device as from the time at which the extruding device has been stopped for starting said cooling thermal transition. Being activated said timer, it is possible to check that the stay time of the elastomeric material, in each unit, is always equal to or lower than the scorch time, measured by Mooney Scorch as stated above.

Since each of the units needs a different time for passing from its working temperature to its non-working temperature on account of its specific stay time, the cooling step of the different units preferably starts at different times during a given non-productive step, so that the cooling of the units lasts for different periods of time.

Thus, for example, during a non-productive step of the process due to an emergency or to a pause, all or some of the units of the extruding device are sequentially cooled by first lowering the temperature of the unit having the maximum working temperature from its preset working temperature down to its non-working temperature. Then, the cooling of a predetermined unit different from said unit having the maximum working temperature starts when the stay time of the elastomeric material, in said unit, reaches a threshold value comprised in the range of from 20% to 99% of the scorch time of the elastomeric material at said maximum working temperature.

Preferably, said at least one shaping die of the extruding device is the first unit to be cooled during said non-productive steps, being the shaping die the unit having the maximum working temperature, while the other units are cooled in sequence according to the different stay time of the elastomeric material in each of said units.

More preferably, during said cooling non-productive step, said units, ranked in decreasing order from the unit having the maximum working temperature to the unit having the minimum working temperature, are: said at least one shaping die, said at least one gear pump, said at least one member for moving the elastomeric material within said at least one housing, and said at least one housing.

In a preferred embodiment, during said non-productive emergencies and pauses steps, the non-working temperature of said unit having the maximum working temperature is set within the range of from 50° C. to 80° C., preferably from 60° C. to 70° C.

According to another preferred embodiment, the present invention further comprises the steps of:

e) cooling said unit having the maximum working temperature at its non-working temperature;

f) maintaining all the remaining units at their respective working temperatures for a time period comprised in the range of from 10 to 40 minutes, more preferably for 20 minutes, before sequentially cooling said remaining units.

After that period of time, a scorching process can occur in said involved unit. That means that, if said emergencies and pauses would last for a prolonged period of time, for example, for more than 20-40 minutes, the temperatures of all the remaining units are decreased from their working temperature to their non-working temperature.

Most advantageously, the process of the present invention allows to manage in a proper way any temporary non-productive step carried out after a productive step entailing the extrusion of the elastomeric material, since the temperatures of the various units of the extruding device are lowered to avoid any scorching phenomena of the elastomeric material standing still in the extruding device.

Most advantageously, such a temperature management is carried out by cooling in sequence the units as necessary, thereby saving energy and reducing heating time once the pause is finished and the cooled unit(s) of the extruding device should be heated again to reach (its) their working temperature.

In a preferred embodiment of the process, such a heating may be carried out in accordance with the procedures illustrated above.

The Applicant has surprisingly found that the process of the present invention allows to reduce the risk that scorching phenomena, which are observed in similar non-productive steps in extrusion processes known in the art, may occur both during the start-up of the process and during pauses of the same. This technical effect has been achieved notwithstanding the various constraints in terms of thermal inertia, stay time and energy consumption which affect the manufacturing equipment available nowadays.

Further features and advantages will become more apparent from the detailed description of a preferred, but not exclusive, embodiment of a method and an apparatus for assembling tires for vehicle wheels, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
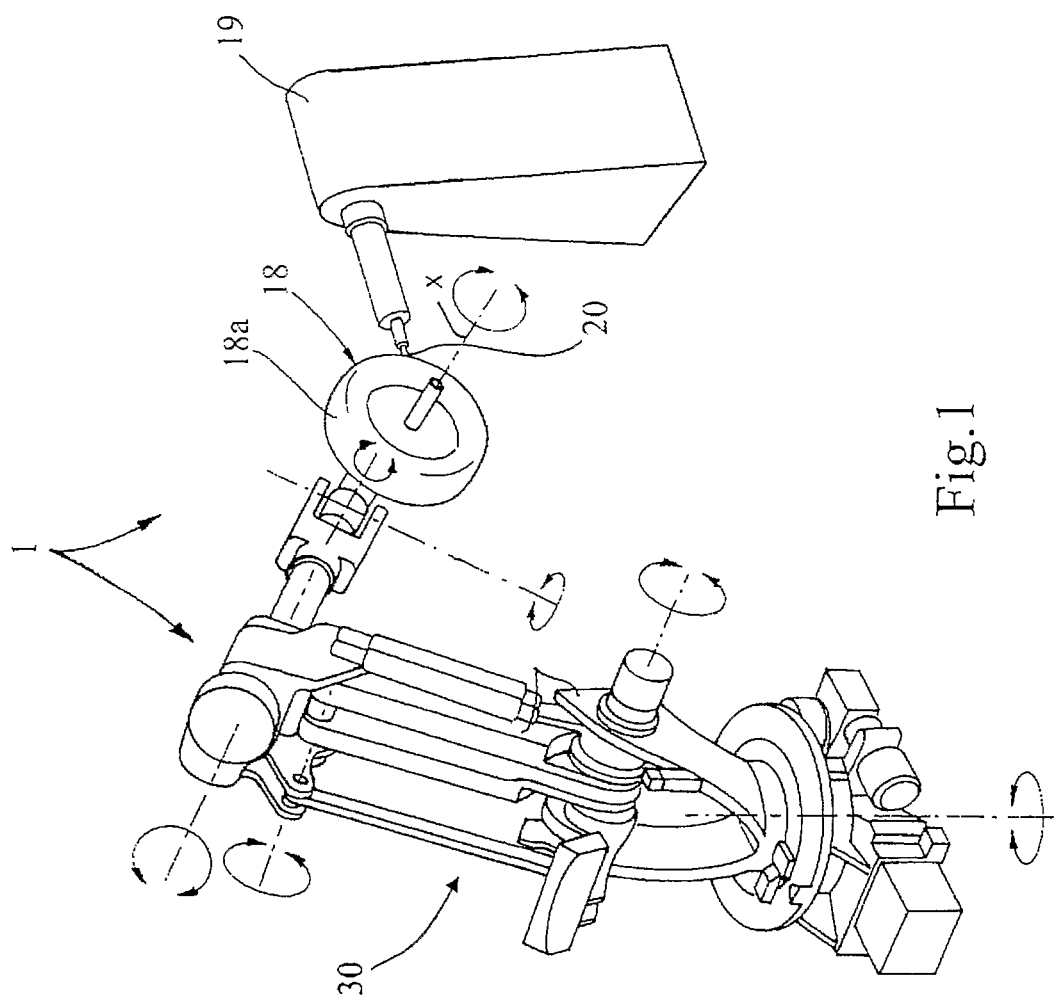
FIG. 1 is a diagrammatic perspective view of a robotized work station for manufacturing an elastomeric tire component of a tire on a substantially rigid toroidal support according to a preferred embodiment of the present invention.

With reference to FIG. 1, a robotized work station intended to manufacture an elastomeric tire component of a tire, for example the tread band thereof, is generally indicated at 1.

The work station 1 is associated to a conventional manufacturing plant for the production of pneumatic tires, or for carrying out part of the working operations foreseen in the production cycle of the pneumatic tires themselves, plant otherwise not illustrated being known per se.

The work station 1 comprises a robotized arm known per se, generally indicated at 30 and preferably of the anthropomorphic type with seven axes, intended to position a toroidal support 18 supporting a carcass structure of the tire, an annular reinforcing structure and a belt structure previously built in a known manner near a delivery position of a continuous elongated element 20, made of a suitable elastomeric material having a suitable size in cross-section, delivered by an extruding device generally indicated at 19. The elastomeric material is thus fed to the extruding device 19 to be extruded to form said elongated element 20.

Preferably, the toroidal support 18 is provided with an outer surface 18a substantially conforming in shape to the inner configuration of the tire to be formed.

Figure 2:
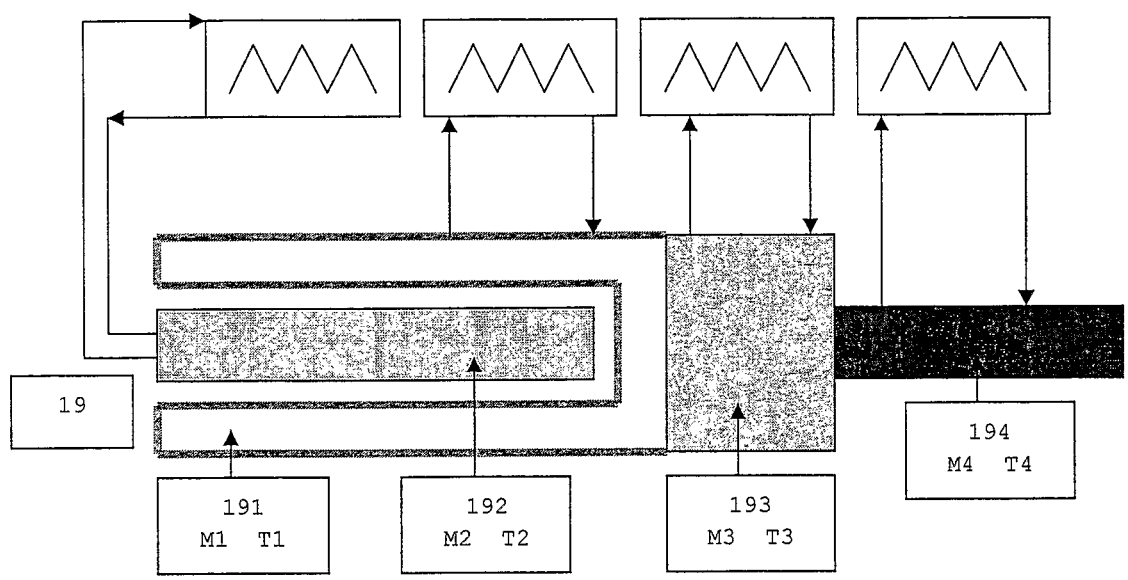
FIG. 2 is a schematic view of an extruding device used in the process of the present invention.

FIG. 2 schematically shows a preferred extruding device 19 used in carrying out the process of the present invention.

The extruding device 19 preferably comprises four different units: one housing unit 191, one screw unit 192 rotatably mounted in the housing 191, one gear pump unit 193 and one shaping die unit 194.

Each of said units is characterized by a specific mass M and by a specific working temperature T. Hence, the heating time of each unit differ from that of the other units.

Figure 3:
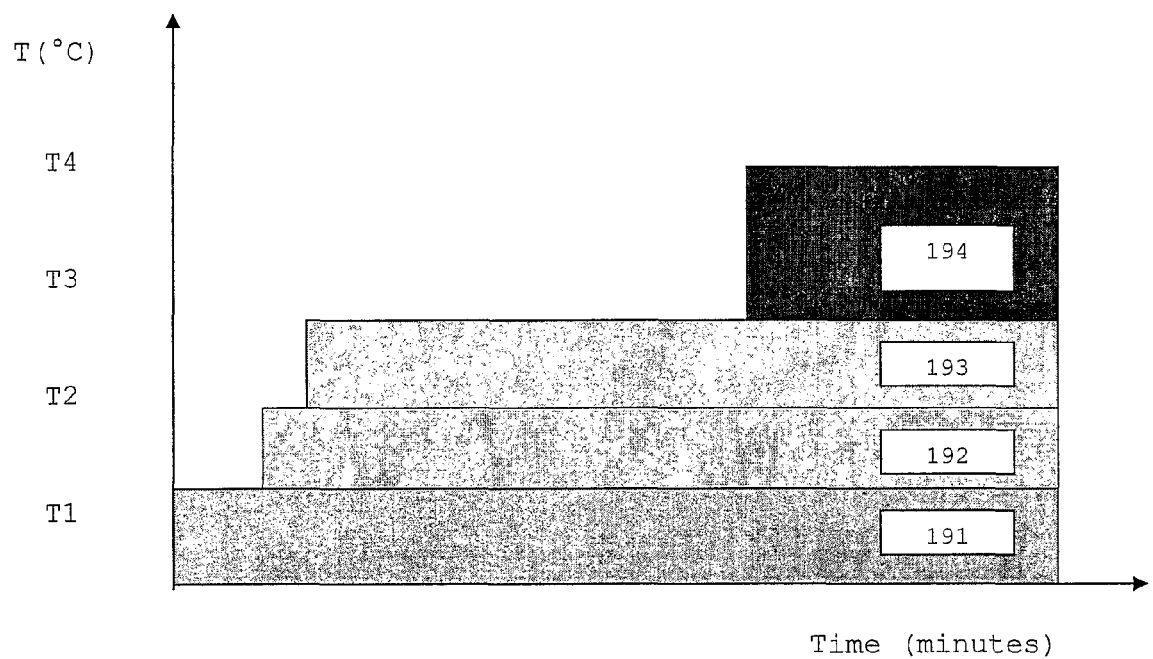
FIG. 3 is a diagram showing the heating sequence during a start-up non-productive step according to the process of the present invention.
Figure 4:
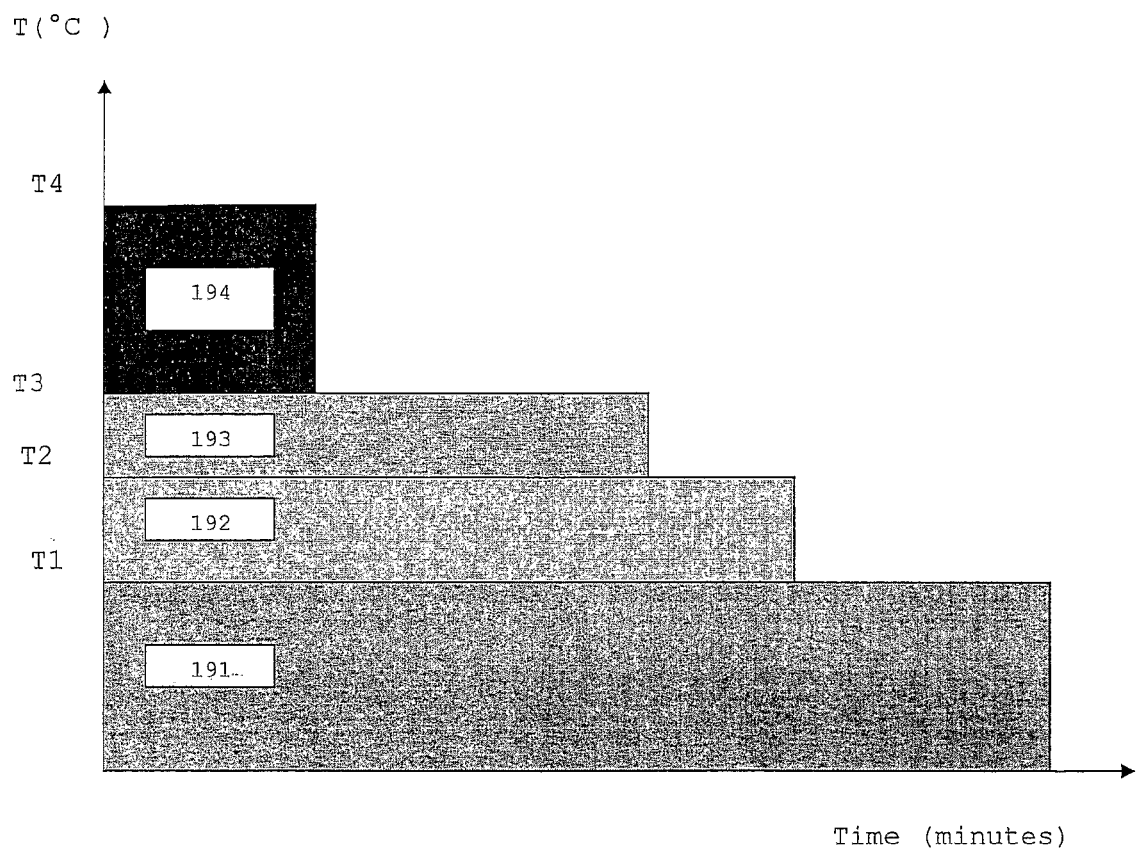
FIG. 4 is a diagram showing the cooling sequence during a temporary non-productive step according to the process of the present invention.

With reference to FIGS. 2-4, a first preferred embodiment of a process for manufacturing an elastomeric tire component according to the present invention will now be illustrated.

In a first non-productive step, the units 191-194 of the extruding device 19 are submitted to a thermal transition by sequentially heating the same starting from the top-ranked unit to the bottom-ranked unit to reach the respective working temperature.

In the illustrated preferred embodiment, the top-ranked unit is the housing unit 191, having a mass M1 and a working temperature T1. Thus, the housing unit 191 is the first unit which is activated in the heating step, due to the fact that this is the unit which needs the highest heating time to reach its working temperature T1, which is for example equal to 70-90° C., preferably about 85° C.

According to a preferred embodiment of the process of the invention, the unit of the extruding device 19 having an immediately lower rank, in this case constituted by the screw unit 192, is heated only when the actual temperature of the housing unit 191 is about to reach the working temperature T1 of the housing unit 191.

In an example, the screw unit 192 may be conveniently heated when the actual temperature of the housing unit 191 of higher rank is about 20° C. lower than its working temperature T1.

Similarly, the gear pump unit 193 is heated only when the actual temperature of the screw unit 192 is about to reach its working temperature T2, which is for example equal to about 75° C., while the shaping die unit 194 is heated only when the actual temperature of the gear pump unit 193 is about to reach its working temperature T3 which is for example equal to about 95° C.

In this example, the working temperature T4 of the shaping die unit 194 may be of about 100° C.

In an example, the gear pump unit 193 may be conveniently heated when the actual temperature of the screw unit 192 of higher rank is about 30° C. lower than its working temperature T2, while the shaping die unit 194 may be conveniently heated when the actual temperature of the gear pump unit 193 of higher rank is about 30° C. lower than its working temperature T3.

In this way, all the four units 191-194 of the extruding device 19 may advantageously reach their respective working temperatures T1, T2, T3 and T4 approximately at the same time, allowing each unit to remain for the minimum possible time at its respective working temperature before the elastomeric material contained in the extruding device 19 could be extruded, thereby substantially reducing the risk that scorching problems could occur.

Once the extruding device 19 and the related extrusion operation carried out by the same reach their steady-state conditions, the extrusion of the elastomeric material in the form of the continuous elongated element 20 may take place so as to form the desired elastomeric component of the tire onto the tire structures already formed on the toroidal support 18.

More particularly, the elongated element 20 is delivered onto the building toroidal support 18 rotatably moving about a geometrical rotation axis thereof, so that the elongated element 20 may be circumferentially applied on the toroidal support 18.

In the preferred embodiment illustrated, the rotary motion of the toroidal support 18 for circumferential distribution thereon of the elongated element 20 is carried out by the robotized arm 30 which conveniently moves the building support 18 in front of the extruding device 19.

During the manufacturing process and should any situation occur along the production line upstream or downstream of the extruding device 19 which may trigger any intentional or accidental pause of the same, the invention provides that a cooling sequence is activated in order to prevent the risk that scorching phenomena of the elastomeric material could occur.

For example, a pause of the extrusion process could occur due to a feeding block of the elastomeric material or to a maintenance working operation.

In such a case, the manufacturing process of the invention comprises a non-productive step in which the units 191-194 of the extruding device 19 are submitted to a thermal transition by sequentially cooling the same starting from the unit having the maximum working temperature to the unit having the minimum working temperature to reach the respective non-working temperature.

According to a preferred embodiment of the process of the invention and as shown in FIG. 4, a timer is then started for each of the four units 191-194 as from the time at which the extruding device has been stopped, in order to check, in each unit, that the stay time of the elastomeric material is always equal to or lower than the scorch time, measured by Mooney Scorch as stated above.

The stay time of the unit having the maximum working temperature, in this case constituted by the shaping die unit 194, is normally set up at a value substantially equivalent to about 50% of the scorch time measured at working temperature of the same unit 194, while the stay time of each of the remaining units 192-194 normally has values higher than said stay time value of unit 194, due to the fact that the temperatures in each of said units are lower than the temperature in unit 194.

At the end of the maximum stay time allowable for unit 194 before scorching at the working temperature thereof may take place, the temperature of unit 194 is decreased to its preset non-working temperature.

As an example, the non-working temperature of unit 194 may have a value of approximately 65° C.

If the problem is solved during the maximum stay time of the elastomeric material in the unit 194 or during its cooling to its non-working temperature, the process of the invention advantageously provides that only unit 194 is to be heated again to its respective working temperatures because, during the stop, only said unit 194 was brought to its non-working temperature while all the remaining units are left at their respective working temperatures.

If, on the contrary, the problem is not solved during the cooling step of the unit 194, the process of the invention provides—according to a preferred embodiment thereof—that the unit of the extruding device 19 having the higher working temperature among the remaining units apart unit 194, in this case constituted by the gear pump unit 193, is cooled when the stay time of said unit 193 is at about 50% of the scorch time measured at working temperature of the same unit 193.

Similarly, if necessary, the screw unit 192 and the housing unit 191 are cooled, in said order, only when the stay time of said units 192 and 191 are at about 40% of the scorch time, respectively, in said units 192 and 191.

In normal set up conditions, when unit 194 is at its non-working temperature, the remaining units 193, 192, 191 can stay at their respective working temperatures approximately for additional 30 minutes in total, before it is necessary to also reduce their actual temperatures to their respective non-working temperatures to avoid scorching problems.

The total time which elapses between the moment in which the equipment finished the last extrusion of the elastomeric material and the passage of all the units 193, 192, 191 from their respective working temperatures to their respective non-working temperatures normally lasts about 40 minutes; said time period normally allows to solve the problems which usually occur in the production lines and which cause a stop of the extrusion process.

If, on the contrary, the cause of the stop of the extrusion process can not be eliminated in due time, all the units 193, 192, 191 pass from their respective working temperatures to their respective non-working temperatures.

If the cause of the stop of the extrusion process persists, an additional period of time is allowed, before all the units are subjected to an additional cooling step that definitively decreases their temperatures from their respective non-working temperatures to the cold equipment temperature, that is the temperature reached by the extruding device and all the units included thereof when the extrusion process is completely stopped.

In case it is possible to eliminate the cause of the stop of the extrusion process during said additional period of time, the process allows the units to reach again their respective working temperatures in a time lower than the time needed in case the units reach said lower cold equipment temperature value.

On the contrary, if it is not possible to eliminate the cause of the stop of the extrusion process during said additional period of time, all the units reach said cold equipment temperature, from which a process involving a new heating step starts again, as the one described above with reference to FIG. 3.

The invention claimed is:
1. A process for manufacturing an elastomeric tire component comprising the steps of:
 a) preparing an elongated element comprising a cross-linkable elastomeric material, by the steps comprising:
   a1) feeding the cross-linkable elastomeric material to an extruding device comprising a plurality of units; and a2) extruding the cross-linkable elastomeric material by means of said extruding device so as to form said elongated element,
    each of said units having a respective working temperature,
    each of said units having a respective non-working temperature lower than said working temperature, and
    each of said units having a respective value of thermal inertia;
b) delivering said elongated element onto a building support rotatably moving about a geometrical rotation axis thereof, so that the elongated element is circumferentially applied on the support;
c) before extruding said cross-linkable elastomeric material, selecting at least two of the plurality of units and submitting the selected units to a thermal transition carried out by heating said selected units starting from the selected unit having the highest value of thermal inertia sequentially to the selected unit having the lowest value of thermal inertia to reach the respective working temperature of each selected unit, wherein the heating of each sequential unit starts after the heating of the previous unit and
d) after extruding said cross-linkable elastomeric material, submitting the selected units to a thermal transition carried out by cooling said selected units starting from the selected unit having the maximum working temperature sequentially to the selected unit having the minimum working temperature to reach the respective non-working temperature of each selected unit, wherein the cooling of each sequential unit starts after the cooling of the previous unit.

2. The process according to claim 1, wherein said units of the extruding device comprise at least one housing, at least one member for moving the elastomeric material within said housing and at least one shaping die.

3. The process according to claim 2, wherein said member for moving the elastomeric material is selected from the group of a screw rotatably mounted in said at least one housing and a piston slidably mounted in said at least one housing.

4. The process according to claim 2, wherein said units of the extruding device further comprise at least one nozzle.

5. The process according to claim 2, wherein said units of the extruding device further comprises at least one gear pump.

6. The process according to claim 2, wherein said at least one housing has a working temperature of 50° C. to 120° C.

7. The process according to claim 6, wherein said at least one housing has a working temperature of 70° C. to 90° C.

8. The process according to claim 2, wherein said at least one member for moving the elastomeric material has a working temperature of 20° C. to 120° C.

9. The process according to claim 8, wherein said at least one member for moving the elastomeric material has a working temperature of 60° C. to about 100° C.

10. The process according to claim 2, wherein said at least one shaping die has a working temperature of 80° C. to 130° C.

11. The process according to claim 10, wherein said at least one shaping die has a working temperature of 90° C. to 120° C.

12. The process according to claim 4, wherein said at least one nozzle has a working temperature of 70° C. to 120° C.

13. The process according to claim 12, wherein said at least one nozzle has a working temperature of 80° C. to 120° C.

14. The process according to claim 5, wherein said at least one gear pump has a working temperature of 70° C. to 120° C.

15. The process according to claim 14, wherein said at least one gear pump has a working temperature of 80° C. to 110° C.

16. The process according to claim 1, further comprising the step of:
e) checking in real-time an actual temperature, the working temperature, the non-working temperature and the difference between said actual temperature and said working temperature of each of said units.

17. The process according to claim 16, wherein said checking step is carried out by means of a temperature control system operatively connected to the extruding device.

18. The process according to claim 17, wherein said temperature control system comprises at least a sensor on a body of each unit.

19. The process according to claim 17, wherein said temperature control system is provided with channels wherein a heat exchange fluid is circulated.

20. The process according to claim 19, wherein said heat exchange fluid is selected from pressurized water or oil.

21. The process according to claim 1, wherein said cross-linkable elastomeric material has a maximum stay time, in each of said plurality of units, 20% to 99% of the scorch time of said cross-linkable elastomeric material at an actual temperature of the unit.

22. The process according to claim 21, wherein said cross-linkable elastomeric material has a maximum stay time, in each of said plurality of units, 20% to 50% of the scorch time of said cross-linkable elastomeric material at the actual temperature of the unit.

23. The process according to claim 2, wherein the unit having the highest value of thermal inertia of the extruding device is said housing thereof.

24. The process according to claim 2, wherein the unit having the lowest value of thermal inertia of the extruding device is said shaping die thereof.

25. The process according to claim 5, wherein said units, in decreasing order from the unit having the highest value of thermal inertia to the unit having the lowest value of thermal inertia, comprise: said at least one housing, said at least one member for moving the elastomeric material within said at least one housing, said at least one gear pump and said at least one shaping die.

26. The process according to claim 1, wherein the heating time of each of said plurality of units differs from the heating time of the remaining units of said plurality by an amount which is lower than or equal to 60 minutes.

27. The process according to claim 26, wherein the heating time of each of said plurality of units differs from the heating time of the remaining units of said plurality by an amount which is lower than or equal to 30 minutes.

28. The process according to claim 1, wherein the heating step of each selected unit different from said unit having the highest value of thermal inertia starts when an actual temperature of the preceding unit of higher thermal inertia reaches a value which is 20° C. to 30° C. lower than the working temperature of said preceding unit.

29. The process according to claim 1, wherein the heating of said plurality of units is carried out so that the units reach their respective working temperature in less than 10 minutes.

30. The process according to claim 1, wherein cooling is managed by activating a timer that is started for each of the units of the extruding device from the time at which the extruding device has been stopped for starting said cooling thermal transition.

31. The process according to claim 1, wherein the cooling of a predetermined unit different from said unit having the maximum working temperature starts when the stay time of the elastomeric material in said unit reaches a threshold value of 20% to 99% of the scorch time of the elastomeric material at said maximum working temperature.

32. The process according to claim 1, wherein the non-working temperature of said unit having the maximum working temperature is 50° C. to 80° C.

33. The process according to claim 5, wherein said units, in decreasing order from the unit having the maximum working temperature to the unit having the minimum working temperature comprise: said at least one shaping die, said at least one gear pump, said at least one member for moving the elastomeric material within said at least one housing, and said at least one housing.

34. The process according to claim 1, wherein the cooling step further comprises the steps of:
cooling said unit having the maximum working temperature to its non-working temperature; and
maintaining all the remaining units at their respective working temperatures for a time period of 10 to 40 minutes before sequentially cooling said remaining units.

35. A process for manufacturing an elastomeric tire component comprising the steps of:
a) preparing an elongated element comprising a cross-linkable elastomeric material, by the steps comprising:
a1) feeding the cross-linkable elastomeric material to an extruding device comprising a plurality of units; and
a2) extruding the cross-linkable elastomeric material by means of said extruding device so as to form said elongated element,
each of said units having a respective working temperature,
each of said units having a respective non-working temperature lower than said working temperature, and
each of said units having a respective value of thermal inertia;
b) delivering said elongated element onto a building support rotatably moving about a geometrical rotation axis thereof, so that the elongated element is circumferentially applied on the support; and
c) after extruding said cross-linkable elastomeric material, selecting at least two of the plurality of units and submitting the selected units to a thermal transition carried out by cooling said selected units starting from the selected unit having the maximum working temperature sequentially to the selected unit having the minimum working temperature to reach the respective non-working temperature of each selected unit, wherein the cooling of each sequential unit starts after the cooling of the previous unit.

36. The process according to claim 35, wherein said units of the extruding device comprise at least one housing, at least one member for moving the elastomeric material within said housing and at least one shaping die.

37. The process according to claim 36, wherein said member for moving the elastomeric material is selected from the group of a screw rotatably mounted in said at least one housing and a piston slidably mounted in said at least one housing.

38. The process according to claim 36, wherein said units of the extruding device further comprise at least one nozzle.

39. The process according to claim 36, wherein said units of the extruding device further comprises at least one gear pump.

40. The process according to claim 36, wherein said at least one housing has a working temperature of 50° C. to 120° C.

41. The process according to claim 40, wherein said at least one housing has a working temperature of 70° C. to 90° C.

42. The process according to claim 36, wherein said at least one member for moving the elastomeric material has a working temperature of 20° C. to 120° C.

43. The process according to claim 42, wherein said at least one member for moving the elastomeric material has a working temperature of 60° C. to about 100° C.

44. The process according to claim 36, wherein said at least one shaping die has a working temperature of 80° C. to 130° C.

45. The process according to claim 44, wherein said at least one shaping die has a working temperature of 90° C. to 120° C.

46. The process according to claim 38, wherein said at least one nozzle has a working temperature of 70° C. to 120° C.

47. The process according to claim 46, wherein said at least one nozzle has a working temperature of 80° C. to 120° C.

48. The process according to claim 39, wherein said at least one gear pump has a working temperature of 70° C. to 120° C.

49. The process according to claim 48, wherein said at least one gear pump has a working temperature of 80° C. to 110° C.

50. The process according to claim 35, further comprising the step of:
d) checking in real-time an actual temperature, the working temperature, the non-working temperature and the difference between said actual temperature and said working temperature of each of said units.

51. The process according to claim 50, wherein said checking step is carried out by means of a temperature control system operatively connected to the extruding device.

52. The process according to claim 51, wherein said temperature control system comprises at least a sensor on a body of each unit.

53. The process according to claim 51, wherein said temperature control system is provided with channels wherein a heat exchange fluid is circulated.

54. The process according to claim 53, wherein said heat exchange fluid is selected from pressurized water or oil.

55. The process according to claim 35, wherein said cross-linkable elastomeric material has a maximum stay time, in each of said plurality of units, 20% to 99% of the scorch time of said cross-linkable elastomeric material at an actual temperature of the unit.

56. The process according to claim 55, wherein said cross-linkable elastomeric material has a maximum stay time, in each of said plurality of units, 20% to 50% of the scorch time of said cross-linkable elastomeric material at the actual temperature of the unit.

57. The process according to claim 36, wherein the unit having the highest value of thermal inertia of the extruding device is said housing thereof.

58. The process according to claim 36, wherein the unit having the lowest value of thermal inertia of the extruding device is said shaping die thereof.

59. The process according to claim 39, wherein said units, in decreasing order from the unit having the highest value of thermal inertia to the unit having the lowest value of thermal inertia, comprise: said at least one housing, said at least one member for moving the elastomeric material within said at least one housing, said at least one gear pump and said at least one shaping die.

60. The process according to claim 35, wherein cooling is managed by activating a timer that is started for each of the units of the extruding device from the time at which the extruding device has been stopped for starting said thermal transition.

61. The process according to claim 35, wherein the cooling of a predetermined unit different from said unit having the maximum working temperature starts when the stay time of the elastomeric material in said unit reaches a threshold value of 20% to 99% of the scorch time of the elastomeric material at said maximum working temperature.

62. The process according to claim 35, wherein the non-working temperature of said unit having the maximum working temperature is 50° C. to 80° C.

63. The process according to claim 39, wherein said units, in decreasing order from the unit having the maximum working temperature to the unit having the minimum working temperature comprise: said at least one shaping die, said at least one gear pump, said at least one member for moving the elastomeric material within said at least one housing, and said at least one housing.

64. The process according to claim 35, wherein the cooling step further comprises the steps of:
    cooling said unit having the maximum working temperature to its non-working temperature; and
    maintaining all the remaining units at their respective working temperatures for a time period of 10 to 40 minutes before sequentially cooling said remaining units.

* * * * *